United States Patent
Kohnen et al.

(10) Patent No.: US 7,787,134 B2
(45) Date of Patent: Aug. 31, 2010

(54) MULTIPLE FANNED LASER BEAM METROLOGY SYSTEM

(75) Inventors: Kirk Kohnen, Fullerton, CA (US); Peter J. Sedivec, Manhattan Beach, CA (US); Douglas Bender, Redondo Beach, CA (US); Gregory S. Becker, Redondo Beach, CA (US); John Y. Liu, San Marino, CA (US); Richard W. Guthrie, Moorpark, CA (US); Ketao Liu, Cerritos, CA (US); Ray McVey, El Segundo, CA (US); Mark A. Lundgren, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/407,549

(22) Filed: Apr. 19, 2006

(65) Prior Publication Data
US 2007/0103699 A1   May 10, 2007

Related U.S. Application Data

(63) Continuation-in-part of application No. 11/270,000, filed on Nov. 9, 2005, now Pat. No. 7,450,251.

(51) Int. Cl.
*G01C 15/00* (2006.01)
(52) U.S. Cl. ............... 356/620; 356/3.1; 356/3.11; 356/622
(58) Field of Classification Search ........... 356/370, 356/625, 3.1
See application file for complete search history.

(56) References Cited

U.S. PATENT DOCUMENTS

| | | | |
|---|---|---|---|
| 4,888,490 A * | 12/1989 | Bass et al. ............. | 250/559.16 |
| 5,243,398 A | 9/1993 | Nielsen | |
| 5,812,267 A * | 9/1998 | Everett et al. ............. | 356/614 |
| 6,219,133 B1 * | 4/2001 | Kawase et al. ......... | 356/139.04 |
| 6,396,571 B2 * | 5/2002 | Ohtomo et al. ............. | 356/5.1 |
| 6,646,723 B1 | 11/2003 | Dubovitsky et al. | |
| 7,110,092 B2 * | 9/2006 | Kasper et al. ............. | 356/4.01 |
| 2002/0196424 A1 * | 12/2002 | Sano et al. ............... | 356/4.01 |
| 2005/0235504 A1 | 10/2005 | Barvosa-Carter et al. | |

(Continued)

FOREIGN PATENT DOCUMENTS

EP   1524497 A1   4/2005

OTHER PUBLICATIONS

Tsumura, T.; Okubo, H.; Komatsu, N. "A Method of Position and Attitude Measurement of Vehicle Using Fan Shaped Laser Beam and Corner Cube", Vehicle Navigation and Information Systems Conference, 1993., Proceedings of the IEEE-IEE, vol., Iss., Oct. 12-15, 1993, pp. 517-520.*

(Continued)

*Primary Examiner*—Gregory J Toatley, Jr.
*Assistant Examiner*—Rebecca C Slomski
(74) *Attorney, Agent, or Firm*—Haynes & Boone, LLP.

(57) ABSTRACT

Systems and techniques for laser metrology. Two or more fanned probe beams are scanned relative to a surface including one or more targets. A position detection module receives return beam information from the fanned probe beams, and determines a position of at least a first target of the one or more targets based on the return beam information.

12 Claims, 3 Drawing Sheets

U.S. PATENT DOCUMENTS

2006/0012777 A1* 1/2006 Talbot et al. ............ 356/139.01

OTHER PUBLICATIONS

Charles F. Bergh, "A Compact, Low Power Two-Axis Scanning Laser Rangefinder For Mobile Robots", Jet Propulsion Lab., Pasadena, CA (pp. 1-6).

Joshua A. Strickon, "Design and HCI Applications of a Low-Cost Scanning Laser Rangefinder", Massachusetts Institute of Technology, Jun. 1999 (pp. 1-140).

UK IPO Search Report, Jul. 26, 2007, Boeing.

* cited by examiner

US 7,787,134 B2

MULTIPLE FANNED LASER BEAM METROLOGY SYSTEM

CROSS REFERENCE TO RELATED APPLICATIONS

This application is a continuation-in-part of and claims priority to U.S. application Ser. No. 11/270,000, filed on Nov. 9, 2005, entitled "A Fanned Laser Beam Metrology System," now U.S. Pat. No. 7,450,251, the disclosure of which is hereby incorporated by reference in its entirety.

BACKGROUND

1. Field of Invention

This invention generally relates to metrology, particularly to optical metrology.

2. Related Art

Metrology techniques are used to measure distances; for example, to precisely determine surface profiles.

One metrology application is the measurement of space structures, which may be referred to as space metrology. Many systems deployed in space require highly accurate pointing and/or precise knowledge of a payload surface profile.

Some examples of such systems include current communication satellite payloads, space-based radar apparatus, and optical payloads.

Existing metrology techniques may not be satisfactory for some applications. For example, some existing space metrology techniques use cameras to monitor targets arrayed on a surface of interest. However, in order to achieve high angular accuracy, either the total number of pixels for the camera needs to be large, or the field-of-view should be small (so that the area imaged by each pixel is relatively small). In order to monitor all relevant targets with a particular accuracy, a large number of cameras may be needed. This increases the complexity of the system, while decreasing its reliability.

Some other space metrology techniques use active targets; that is, devices positioned on the surface of the structure that require power to perform one or more functions in response to received light. Some examples of active targets are photodiodes or lasers. Metrology systems using active targets may be advantageous in some circumstances, since light need not travel round-trip (as it does for passive targets), and since the system can electronically determine and/or control which target is being measured at a particular time. However, active targets increase the complexity of the system (e.g., because of the necessary cabling), and so may be more expensive and less reliable than passive targets. Active targets also increase the overall system weight, and may be difficult to package into a deployable structure.

Other existing metrology techniques use laser trackers and/or scanning lidar (light detection and ranging). These systems scan a collimated laser beam over a large field of view. The two-dimensional scan may be complex, and it may be difficult to scan the targets in a time sufficient to meet overall system metrology bandwidth requirements.

Other metrology techniques use multiple scanning fanned laser beams with active targets (such as photodiodes). The active targets generate signals in response to receiving light from the multiple scanning fanned laser beams. The signals from the targets are then processed, and the target position determined using triangulation.

Depending on the implementation, techniques using multiple scanning fanned laser beams may be impractically complex and slow, while the alignment and other intrinsic errors between the laser beams may affect the overall accuracy. Further, active targets may be less reliable and more complex than passive targets.

SUMMARY

Systems and techniques herein may provide for a relatively simple and light-weight metrology system that provides accurate position information for targets on a surface.

In general, in one aspect, a metrology system comprises a scanner configured to generate relative motion of a first fanned probe beam and a second fanned probe beam with respect to a surface including a first target about a scan axis. The system may further comprise a light source system configured to generate the first fanned probe beam having a first wavelength, a first modulation frequency, and a first tilt angle with respect to the scan axis. The light source system may be further configured to generate the second fanned probe beam having a second different wavelength, a second different modulation frequency, and a second different tilt angle with respect to the scan axis. The system may further comprise a position detection module configured to receive a first reflected return beam having the first wavelength and first modulation frequency from the first target and to receive a second reflected return beam having the second wavelength and the second modulation frequency from the first target and configured to determine a position of the first target using information indicative of the first return beam and the second return beam.

The position detection module may be configured to determine the position of the first target using a range and a scan angle associated with the first return beam. The position detection module may be further configured to determine the position of the first target using a range and a scan angle associated with the second return beam.

The information indicative of the first return beam may include a range, and the position detection module may include a phase processing module configured to determine the range using phase information associated with the first modulation frequency and phase information associated with the first return beam.

The light source system may comprise a first laser source in communication with an amplitude modulation driver system configured to drive the first laser at the first modulation frequency. The scanner may comprise a scanning mirror, and the system may further comprise an angular measurement sensor in communication with the scanning mirror and configured to generate a signal indicative of a scan angle of the mirror.

In general, in another aspect, a metrology system may comprise scanning means for generating relative motion of a first fanned probe beam and a second fanned probe beam with respect to a surface including a first target about a scan axis. The system may further comprise means for generating the first fanned probe beam having a first wavelength, a first modulation frequency, and a first tilt angle with respect to the scan axis. The system may further comprise means for generating the second fanned probe beam having a second different wavelength, a second different modulation frequency, and a second different tilt angle with respect to the scan axis. The system may further comprise means for receiving a first reflected return beam having the first wavelength and first modulation frequency from the first target and means for receiving a second reflected return beam having the second wavelength and the second modulation frequency from the first target. The system may further comprise means for determining a position of the first target using information indicative of the first return beam and the second return beam.

In general, in another aspect, a method of determining a three-dimensional position of a first target (e.g., a retro-reflective target) may comprise generating a first probe beam having a first wavelength, a first amplitude modulation frequency, and a first tilt angle with respect to a scan axis, generating a second probe beam having a second wavelength, a second amplitude modulation frequency, and a second tilt angle with respect to the scan axis, and scanning the first probe beam and the second probe beam about the scan axis. The method may further comprise reflecting from the first target the first probe beam as a first reflected beam and detecting the first reflected beam. The method may further comprise determining a first range and a first scan angle based on detecting the first reflected beam. The method may further comprise reflecting from the first target the second probe beam as a second reflected beam, detecting the second reflected beam, and determining a second range and a second scan based on detecting the second reflected beam. The method may further comprise determining the three-dimensional position of the first target using the first range, the second range, the first scan angle, and the second scan angle.

Determining the first scan angle may comprise determining the first scan angle based on an angular position of a scanner at a time at which the first reflected beam is received and a correction factor indicative of the first range and a scan rate.

The first probe beam may be generated using a driver configured to drive a light source at the first modulation frequency, and determining the first range may comprise determining the first range using a phase of the first reflected beam and a phase of an output of the driver.

These and other features and advantages of the present invention will be more readily apparent from the detailed description of the exemplary implementations set forth below taken in conjunction with the accompanying drawings.

BRIEF DESCRIPTION OF THE DRAWINGS

Like reference symbols in the various drawings indicate like elements.

DETAILED DESCRIPTION

Figure 1:
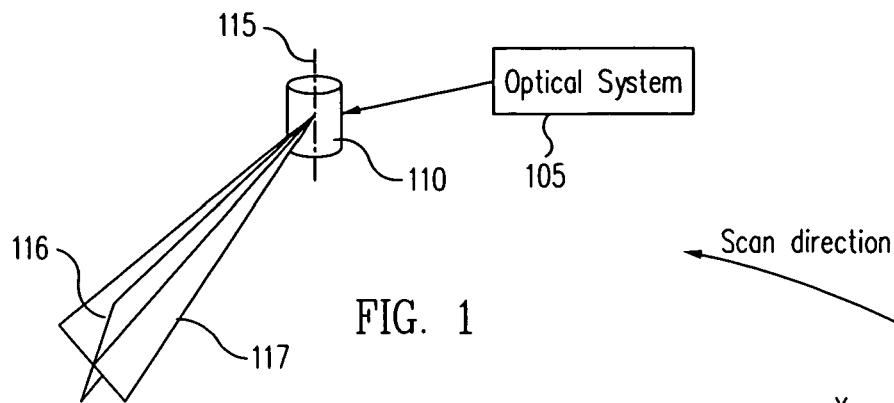
FIG. 1 is a schematic perspective view of a metrology system, according to some embodiments.

Systems and techniques described herein may provide for precise metrology without the cost, complexity, and weight encountered with some available metrology techniques. The systems and techniques may be particularly beneficial for space metrology applications.

In space metrology, a number of characteristics may be important. For example, measurement accuracy requirements may be stringent, so that position information (e.g., surface deformation information) is known to within an allowable margin. In some applications, measurement accuracy requirements may be on the order of a millimeter or less over a large range. Further, the scanning rate for obtaining location information should be larger than a particular bandwidth requirement (where the term "bandwidth" herein refers to the frequency with which position data may be obtained for all relevant targets, and is generally selected to capture enough motion data to characterize the dynamic modes of the surface). Additionally, the metrology system should be lightweight, reliable, and relatively simple.

The systems and techniques provided herein use two or more probe beams (such as substantially two-dimensional fanned laser beams) that are moved relative to a surface of an object. The probe beams have at least some different characteristics; for example, they may have different wavelengths and/or modulation frequencies. The two-dimensional probe beams extend in first and second directions, and are scanned about a scan axis defining a third different direction. The angle between the first direction and the third direction is referred to herein as the tilt of the first probe beam (the first tilt), while the angle between the second direction and the third direction is referred to as the second tilt. The surface has a plurality of reflective targets positioned either regularly or irregularly thereon. The first tilt and the second tilt are unique, so that the position of the targets may be determined in three dimensions.

The relative motion of the probe beams and the surface enables narrow slices of the surface to be sampled at any particular time. If at least a portion of a target is illuminated by one or more of the probe beams, a return beam is generated. The return beams from both probe beams are detected, and used to determine the position of the associated target(s).

For beams reflected from a particular target for each of the probe beams, two measurements are made: the rotation angle of the scanner about the scan axis (which is referred to as the azimuth angle), and the range to the particular target. The measurements obtained using each of the two probe beams are combined to determine the three-dimensional position of the particular target. As the probe beams scan the surface of interest, each of the targets is illuminated by each of the probe beams, and three-dimensional position information is determined for each target of interest.

The systems and techniques provide for accurate and relatively simple determination of target position. The disclosed apparatus enables accurate measurements with simplified optical and electrical subsystem designs than those of co-pending application Ser. No. 11/270,000. For example, the current systems and techniques allows for position determination without the need to measure the angular return from a target in the plane of the fanned beam.

FIG. 1 is a schematic illustration of the principal of operation of a metrology system 100, in some embodiments. One or more light sources in a transmit and receive optical system 105 generate metrology light to be scanned across a surface of interest including one or more passive targets. The metrology light includes a plurality of probe beams such as a first tilted fan beam 116 and a second tilted fan beam 117. For a dual fan beam system such as that illustrated in FIG. 1, optical system 105 may comprise a first laser system configured to generate a fanned laser beam of a first wavelength, modulation frequency, and tilt angle, and a second laser system configured to generate a fanned laser beam of a second different wavelength, a second different modulation frequency, and a second different tilt angle. The first and second laser systems may be housed together or separately.

Light from optical system 105 is incident on a scanner 10, which is configured to scan first tilted fan beam 116 and second tilted fan beam 17 about a scan axis 15. Scanner 110 may comprise a multi-facet mirror (e.g., a cylindrical prism) that rotates continuously about a fixed spin axis. As the mirror rotates, the probe beams are reflected off a facet and scanned across the surface to be measured. As the probe beams scan the surface, they sweep across the targets on the surface (not shown). The targets may be retro-reflective targets configured to reflect light and produce a reflected return beam substantially parallel to the incoming light.

The return beam signals are received in optical system 105 and detected using a detector such as a photodiode. The detector generates a signal in response to receiving a return beam. The signal is then processed in a position detection module to determine the position of the target generating the return beam. The position detection module may be configured to determine 3-dimensional position information for each of the targets of interest using a received reflected beam from each target associated with the first probe beam, as well as a received reflected beam associated with the second probe beam. The position detection module may determine the 3-dimensional position information using hardware, software, firmware, or a combination.

Figure 2:
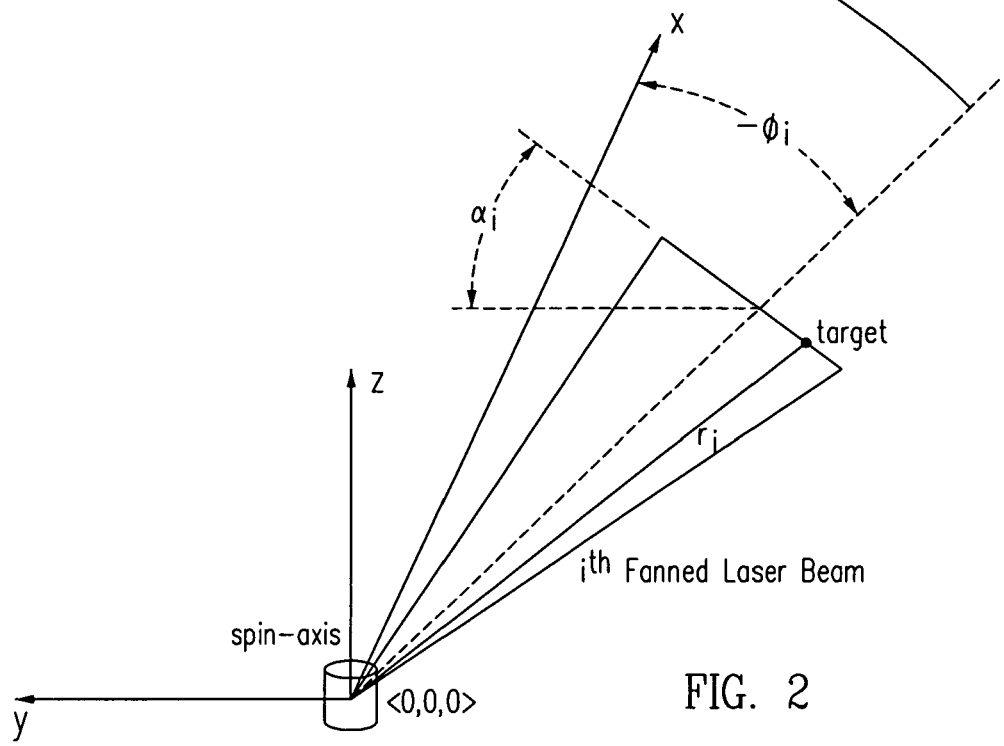
FIG. 2 illustrates the parameters of one of a plurality of probe beams, according to some embodiments.

FIG. 2 shows the coordinate system, parameters, and measurement signal for the probe beams using the example of the i-th probe beam. The i-th fan beam has a known fan tilt angle $\alpha_i$. In FIG. 2, the fan tilt angle is shown relative to the y (non-scan) axis; however, the tilt angle may also be defined relative to the z (scan) axis. The i-th fan beam is used for two measurements: (1) the range to the target, $r_i$, and (2) the fan beam scan angle $\phi_i$. Combining the measurement from two fan beams with known fan tilt angles allows a range to be computed for a given target. The total metrology system field of view (FOV) is a function of the fan beam width, fan tilt angles, and the scan angle for a given scan.

Figure 3:
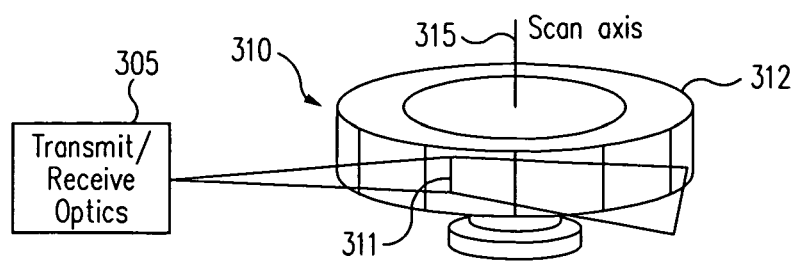
FIG. 3 shows a scanner and its relationship to an optical system, according to some embodiments.

As noted above, the scanner may comprise a multi-facet mirror. FIG. 3 shows a scanner 310 comprising a multi-facet mirror 312 rotating about a scan axis 315. At the time represented by FIG. 3, light from an optical system 305, which may include both transmit and receive optics, is incident on mirror 312 at a location 311. The light is reflected substantially specularly (i.e., the angle of reflection is substantially equal to the angle of incidence), and reflected light is incident on an object (not shown). As the mirror rotates about scan axis 315, the angle of incidence (and thus the angle of reflection) changes, so that the probe beam scans across the object. Note that a single probe beam is shown in FIG. 3 for simplicity; however, for the systems and techniques described herein multiple probe beams are used.

Figure 4:
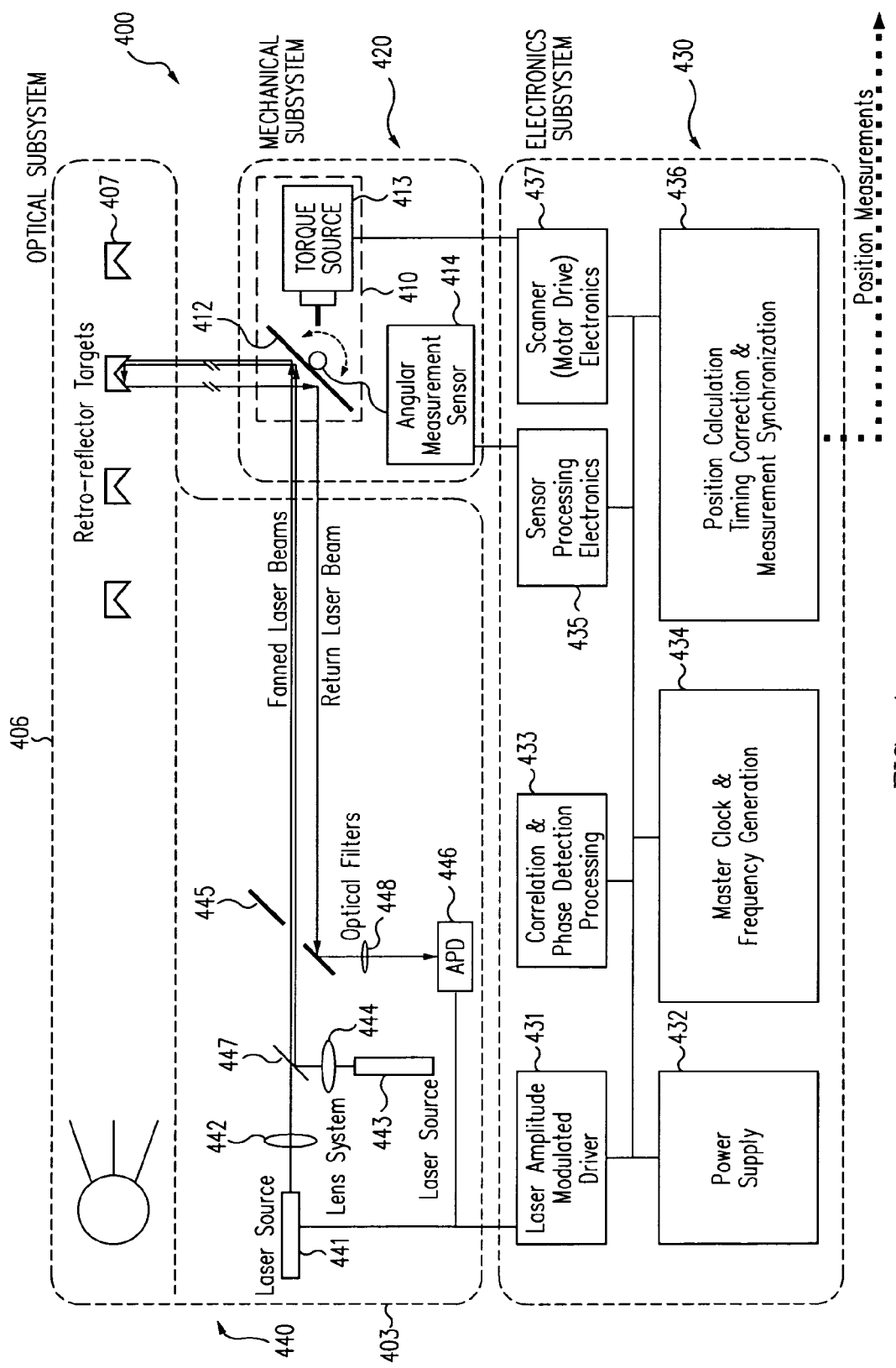
FIG. 4 is a schematic block diagram of a metrology system, according to some embodiments.

FIG. 4 is a block diagram of the optical, electronic, and mechanical subsystems and their integration in an exemplary system 400. System 400 includes an optical subsystem 440, a mechanical subsystem 420, and an electronics subsystem 430.

Optical subsystem 440 includes a transmit and receive optical system 405 and a target optical system 406, including one or more targets 407 positioned on a surface of interest. In the illustrated embodiment, the targets are retro-reflector targets that generated a return beam substantially parallel to the incident beam.

In operation, a laser amplitude modulated driver 431 drives a first laser source 441 with an output amplitude that is modulated at a first modulation frequency. First laser source 441 is configured to generate light of a first wavelength. Driver 431 further drives a second laser source 443, which is configured to generate light of a second different wavelength, at a second modulation frequency.

The output of first laser source 441 is incident on a fanning apparatus such as a cylindrical lens 442. Lens 442 generates a first fanned probe beam based on incident light from laser source 441. The first fanned probe beam has a first tilt angle with respect to a scan axis of a scanner 410, and has a cross section with a width that is substantially smaller than its height. Similarly, the output of second laser source 443 is incident on a fanning apparatus such as a cylindrical lens 444, which generates a second fanned probe beam having a second tilt angle with respect to the scan axis.

The first and second fanned probe beams are combined using internal transmit optics such as a mirror 447, and pass through an aperture in a mirror 445. The fanned probe beams are incident on a scanner 410 that includes a scan mirror 412 and a torque source 413. Torque source 413 is configured to apply torque to scan mirror 412 to scan the probe beams across a surface including targets 407. A motor driver 437 is used to drive torque source 413.

When one of the beams hits a target 407, a collimated return beam is reflected back onto scan mirror 412 and subsequently reflected to receive optics by mirror 445. The receive optics include one or more optical filters 448 and an amplitude/phase detector (APD) 446, which includes a photodiode.

APD 446 generates an output signal indicative of the amplitude and phase of the return beam. The output signal is received by a correlation and phase detection module 433, where it is mixed with a reference signal from driver 431. This produces a signal with an intermediate frequency that is lower than the modulation frequency, yet preserves the phase difference of the return beam with respect to the modulation frequency. Information indicative of the phase difference between the return beam and the reference signal is then determined, and the range of the return beam is determined using a position calculation, timing correction, and measurement synchronization module 436.

Module 436 also uses the amplitude information from the correlation and phase detection module 446 to determine the range of the target. As the fanned beam begins to illuminate a particular target, the return beam initially has a low amplitude. The amplitude increases as more of the fanned beam illuminates the target, until it reaches a maximum level where the entire fanned beam illuminates the target. The amplitude begins to decrease once the edge of the fanned beam crosses the edge of the target, until it returns to zero. Module 436 may use the time-dependent amplitude of the return signal to determine information indicative of the centroid of the signal, then use the information in the scan angle timing determination.

The scan angle for the return beam is determined using an angular measurement sensor 414 and sensor processing electronics 435. Timing correction is implemented in module 436 so that the scan angle information received from sensor 414 is corrected to compensate for the difference between the scan angle at the time the return beam is received and the scan angle at the time the return beam is generated.

Position information for a particular target obtained from a first probe beam (e.g., information indicative of the first range and first scan angle) may then be combined with position information for the same target obtained from the second probe beam (e.g., information indicative of the second range and second scan angle). In the exemplary system shown in FIG. 4, position calculation, timing correction, and measurement synchronization module 436 receives the position information for both probe beams and correlates the information to determine a three-dimensional position of the target.

System 400 may include additional constituents. For example, system 400 may include a power supply 431 to supply power to one or more elements of system 400. System 400 may further include a master clock and frequency generation module 434 to supply clock and frequency signals to appropriate modules, such as the laser amplitude modulated driver 431.

Figure 5A:
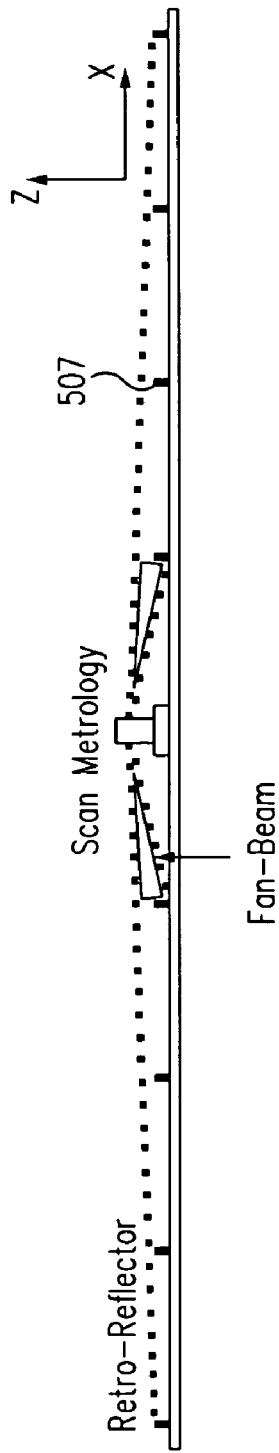
FIGS. 5A and 5B illustrate an application of a metrology system, according to some embodiments.
Figure 5B:
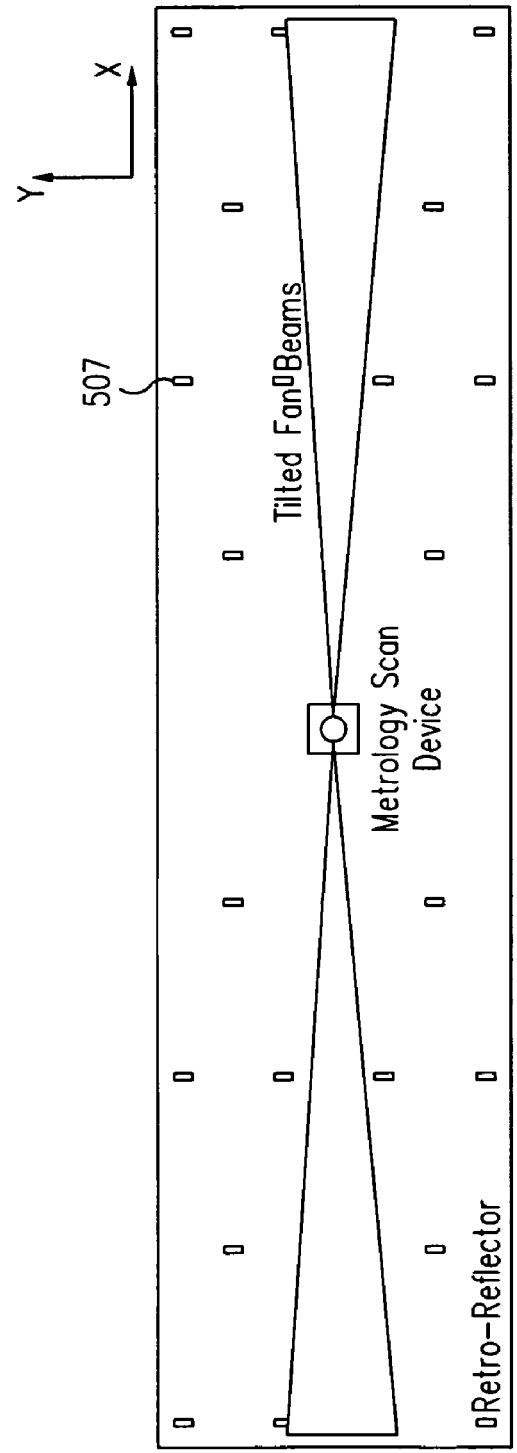

A metrology system such as the system described above may be used in a number of applications. FIGS. 5A and 5B show side and top views (respectively) of a metrology system configuration for a large phased array system similar to that on a radar payload.

For the example illustrated in FIGS. 4A and 4B, a plurality of targets 507 are separated by a distance dy in the y direction that is less than a separation distance dx in the x direction. The positioning of targets on a surface may be selected based on the application, based on convenience, or based on a desired measurement bandwidth. For example, the targets may be separated by the same distance in the x and y directions, or the x and/or y separation may vary across the surface.

Note that although metrology systems using a single probe beam may be beneficial in some circumstances, it may be more difficult to determine target position information when multiple return beams are received at substantially the same time. However, because the current systems and techniques use multiple probe beams, the problem of multiple return beams is relatively simple to deal with. For example, although a first probe beam may be incident on two targets at substantially the same time, the second probe beam will be incident on those two targets at different times (because the two tilt angles are different). Thus, the position of each of the two targets may be determined using the information from the two different probe beams.

As noted above, the current systems and techniques provide a number of benefits over some available systems incorporating multiple fanned probe beams. First, other systems use active detectors that detect the two fanned laser beams and an additional strobe pulse. In order to make measurements, an active target needs to receive pulses from a minimum of two scanners. The target location is then determined based on triangulation. In order to determine position, at least three reference targets are needed to define a coordinate system. Range is not measured directly, but inferred from other measurements. Thus, the current systems and techniques provide a simpler measurement scheme while increasing the system reliability through the use of passive targets.

In implementations, the above described techniques and their variations may be implemented at least partially as computer software instructions. Such instructions may be stored on one or more machine-readable storage media or devices and are executed by, e.g., one or more computer processors, or cause the machine, to perform the described functions and operations. For example, at least some of the functionality of the mechanical and electronics subsystems of FIG. 4 may be provided at least partially using software.

A number of implementations have been described. Although only a few implementations have been disclosed in detail above, other modifications are possible, and this disclosure is intended to cover all such modifications, and most particularly, any modification which might be predictable to a person having ordinary skill in the art. For example, although system functionality is shown as being performed by different modules, the implementation may be different. For example, separate modules may be used, or at least some functionality described as being performed by different modules may be provided by a single hardware and/or software module.

Also, only those claims which use the words "means for" are intended to be interpreted under 35 USC 112, sixth paragraph. Moreover, no limitations from the specification are intended to be read into any claims, unless those limitations are expressly included in the claims. Accordingly, other embodiments are within the scope of the following claims.

What is claimed is:

1. A metrology system comprising:
a scanner configured to rotate a first fanned probe beam and a second fanned probe beam about a scan axis with respect to a common origin for the first and second fanned probe beams, wherein the first fanned probe beam extends in a first direction and in a second direction, the first and second directions and the scan axis all being orthogonal to each other, and wherein the rotation of the first fanned probe beam about the scan axis defines a first scan angle, the first fanned probe beam being tilted with respect to the second direction by a first tilt angle, and wherein the second fanned probe beam extends in the first and second directions and is tilted with respect to the second direction by a second tilt angle that differs from the first tilt angle, the rotation of the second fanned probe beam about the scan axis defining a second scan angle, the first fanned beam being collinear with the second fanned probe beam,
a light source system configured to generate the first fanned probe beam having a first wavelength and a first modulation frequency, the light source system further configured to generate the second fanned probe beam having a second different wavelength and a second different modulation frequency; and
a position detection module configured to receive a first reflected return beam having the first wavelength and first modulation frequency from a first target and to receive a second reflected return beam having the second wavelength and the second modulation frequency from the first target and configured to determine a position of the first target using a range and the first scan angle associated with the first return beam and a range and the second scan angle associated with the second return beam.

2. The system of claim 1, wherein the position detection module includes a phase processing module configured to determine the range using phase information associated with the first modulation frequency and phase information associated with the first return beam.

3. The system of claim 1, wherein the light source system comprises a first laser source in communication with an amplitude modulation driver system configured to drive the first laser at the first modulation frequency.

4. The system of claim 1, wherein the scanner comprises a scanning mirror, and wherein the system further comprises an angular measurement sensor in communication with the scanning mirror and configured to generate a signal indicative of a scan angle of the scanning mirror.

5. A metrology system comprising:
scanning means for rotating a first fanned probe beam and a second fanned probe beam about a scan axis with respect to common origin for both the first and second fanned probe beams, wherein the first fanned probe beam extends in a first direction and in a second direction, the first and second directions and the scan axis all being orthogonal to each other, and wherein the rotation of the first fanned probe beam about the scan axis defines a first scan angle, the first fanned probe beam being tilted with respect to the second direction by a first tilt angle, and wherein the second fanned probe beam extends in the first and second directions and is tilted with respect to the second direction by a second tilt angle that differs from the first tilt angle, the rotation of the second fanned probe beam about the scan axis defining a second scan angle, the first fanned probe beam being collinear with the second fanned probe beam;

means for generating the first fanned probe beam having a first wavelength and a first modulation frequency;

means for generating the second fanned probe beam having a second different wavelength and a second different modulation frequency; and means for receiving a first reflected return beam having the first wavelength and first modulation frequency from a first target;

means for receiving a second reflected return beam having the second wavelength and the second modulation frequency from the first target; and means for determining a position of the first target from a range and the first scan angle associated with the first return beam and for determining a position of the second target from a range and the second scan angle associated with the second return beam.

6. The system of claim 5, wherein the means for determining the position of the first target includes a means for determining the range using phase information associated with the first modulation frequency and phase information associated with the first return beam.

7. The system of claim 5, wherein the means for generating a first fanned probe beam comprises a first laser source in communication with an amplitude modulation driving means for modulating the amplitude of the first laser at the first modulation frequency.

8. The system of claim 5, wherein the scanning means comprises a scanning mirror, and wherein the system further comprises an angular measurement sensor in communication with the scanning mirror and configured to generate a signal indicative of a scan angle of the mirror.

9. A method of determining a three-dimensional position of a first target comprising:

generating a first probe beam with respect to a scan axis, the first probe beam having a first wavelength and a first amplitude modulation frequency, wherein the first probe beam extends in a first direction and in a second direction from the scan axis, the first and second directions and the scan axis all being orthogonal to each other, the first fanned beam being tilted with respect to the second direction by a first tilt angle;

generating a second probe beam with respect to the scan axis, the second probe beam having a second wavelength and a second amplitude modulation frequency, wherein the second probe beam extends in the first and second directions from the scan axis and is tilted with respect to the second direction by a second tilt angle that differs from the first tilt angle, and wherein the first and second probe beams are collinear and extend from a common origin;

rotating the first probe beam and the second probe beam about the scan axis, wherein the rotation of the first probe beam about the scan axis defines a first scan angle and the rotation of the second probe beam about the scan axis defines a second scan angle;

reflecting from the first target the first probe beam as a first reflected beam;

detecting the first reflected beam;

determining a first range and a first scan angle based on detecting the first reflected beam;

reflecting from the first target the second probe beam as a second reflected beam;

detecting the second reflected beam;

determining a second range and a second scan angle based on detecting the second reflected beam; and determining the three-dimensional position of the first target using the first range, the second range, the first scan angle, and the second scan angle.

10. The method of claim 9, wherein the first target is a retro-reflective target.

11. The method of claim 9, wherein determining the first scan angle comprises determining the first scan angle based on an angular position of a scanner at a time at which the first reflected beam is received and a correction factor indicative of the first range and a scan rate.

12. The method of claim 9, wherein the first probe beam is generated using a driver configured to drive a light source at the first modulation frequency, and wherein determining the first range comprises determining the first range using a phase of the first reflected beam and a phase of an output of the driver.

* * * * *